Feb. 2, 1965     N. E. BATESON     3,168,054
CONTAINER LOADING EQUALIZER

Filed Oct. 16, 1961            3 Sheets-Sheet 2

Inventor
Norman E. Bateson
By Wayne Morris Russell
Atty.

United States Patent Office 3,168,054
Patented Feb. 2, 1965

3,168,054
CONTAINER LOADING EQUALIZER
Norman E. Bateson, Munster, Ind., assignor to Pullman Incorporated, Chicago, Ill., a corporation of Delaware
Filed Oct. 16, 1961, Ser. No. 145,286
7 Claims. (Cl. 105—366)

The present invention relates to freight vehicles and, more particularly, to freight vehicles adapted to transport cargo-carrying containers.

It is common practice to carry lading or cargo in containers which are constructed so as to be demountably secured on freight-carrying vehicles, such as truck trailers, railway freight vehicles and the like. One problem which tends to be troublesome has been the loading of a filled container onto the freight vehicle without incurring damage to the container. Frequently, the hoisting apparatus which is employed to locate and mount the container on the support structure of the vehicle is of the type which is not readily susceptible to lowering and positioning the container horizontally on the container supporting structure of a freight vehicle. Under some circumstances, the hoisting equipment applies the container on the support in a tilted or canted attitude such that one of the bottom end edges of the container strikes the container support with a sharp impact, causing a localized stress condition at this end edge of the container. The localized stresses caused by the impact may be greater than the design factors built into the container along this end edge so that the container and, under some circumstances, the cargo contained therein may be damaged.

It is a principal object of the present invention to provide a freight vehicle with a container supporting structure having means for relieving the stresses applied on the bottom end edges of the container when the latter are subject to striking the vehicle container support under sharp impact.

It is still a further object to provide a freight vehicle with a container supporting structure having means constructed and arranged to equalize and distribute the forces of a localized impact on the bottom end edges of a container being lowered on a vehicle support structure, and thereby to minimize the damage which would ordinarily occur under the severe stresses created by the impact force during lowering of the container onto the support in a canted position.

In accordance with the present invention, the above objects are accomplished generally by incorporating into the container support structure of the freight vehicle means which are mounted in a manner so as to be movable upon contacting a bottom end edge of a container being lowered on the support and which assume the attitude of the container as it is being lowered so that the stresses caused by force of a localized impact are distributed and equalized over a greater area into other structural components of the container.

Further objects and features will hereinafter appear.

Figure 1:
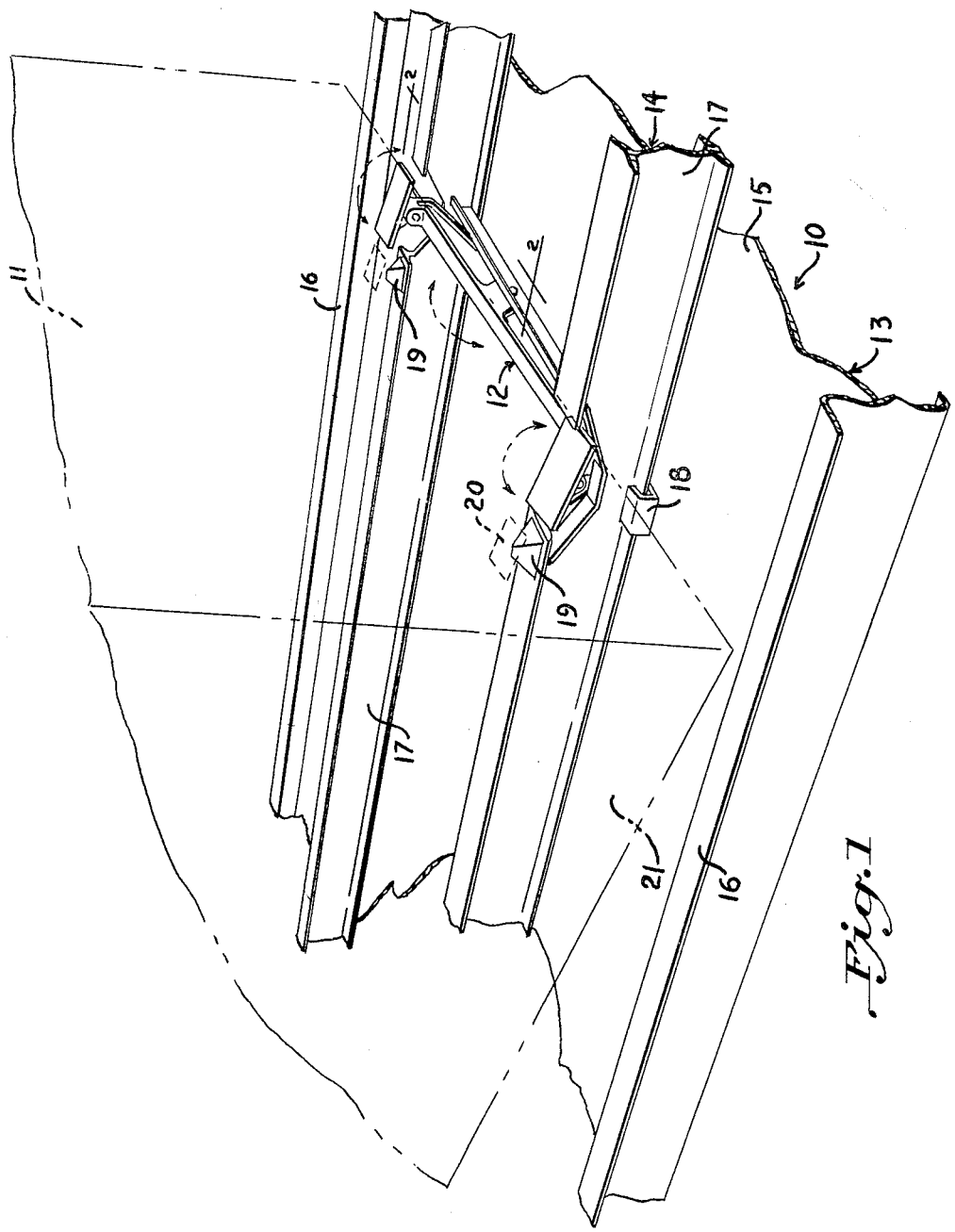
FIG. 1 is a fragmentary perspective view of a railway vehicle particularly adapted to transport containers and embodying the present invention for relieving the impact forces on the container which is shown being lowered onto the container support structure in a tilted or canted attitude.
Figure 2:
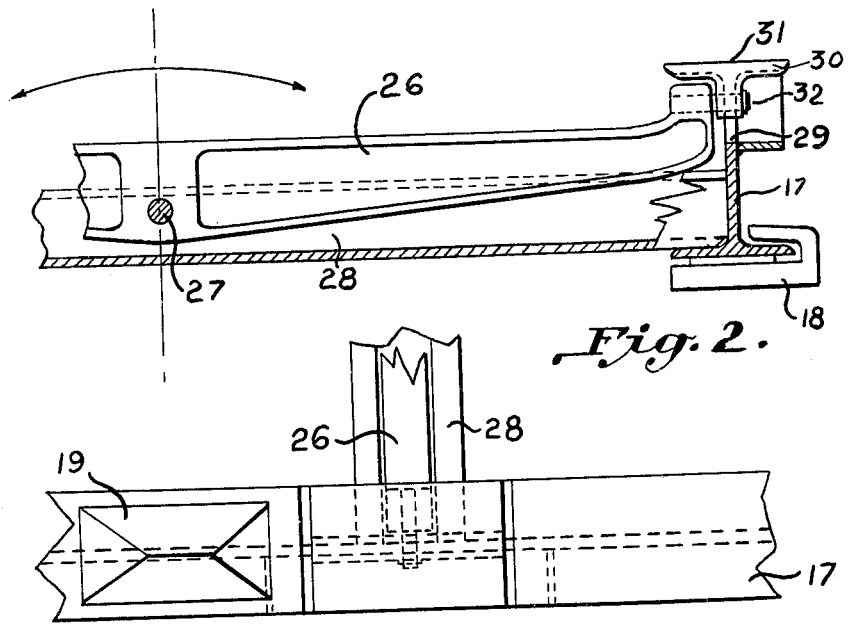
FIG. 2 is a fragmentary front elevational view of the container stress relieving device taken substantially along the lines 2—2 of FIG. 1, but showing the parts of the stress relieving device in a normal container-carrying position.
Figure 3:
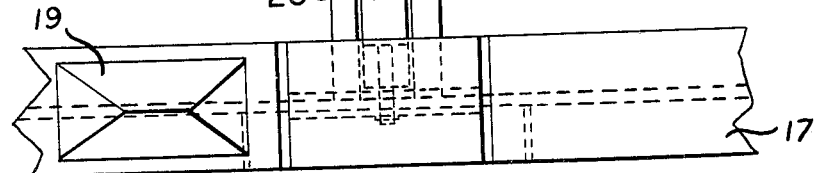
FIG. 3 is a fragmentary top plan view of one side of the container platform showing the container stress relieving device in its normal position.
Figure 4:
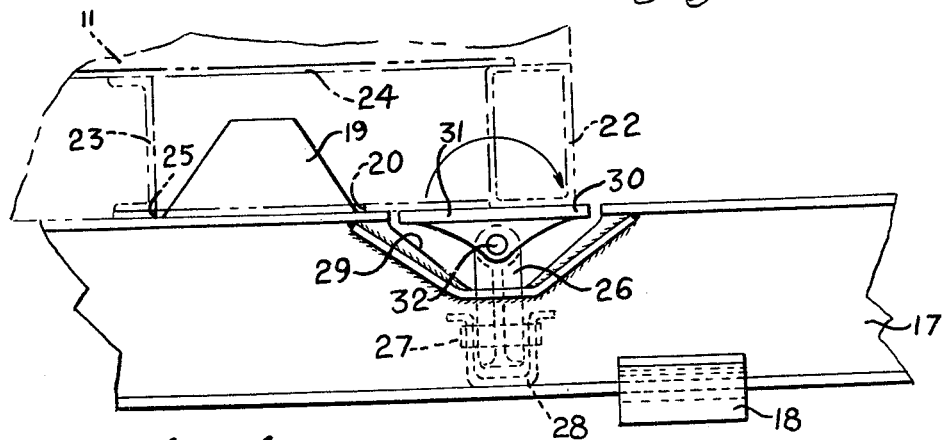
FIG. 4 is a side elevational view of FIG. 3 showing, in particular, the relationship of the container positioning means and the stress relieving device on the rigid member of the container support platform and also showing a container in phantom lines.

Referring now to FIGS. 1–4, there is shown a section of one form of railway vehicle 10 particularly adapted for transporting containers 11 thereon and embodying the arrangement 12 for relieving localized stresses on the container during the loading of the latter on the vehicle. It is to be understood that the stress relieving structure 12 of the present invention is susceptible to being embodied in other different types of freight vehicles, such as trailer trucks and the like where the problem of severe impact forces on a container during the loading of the latter exists.

The railway freight vehicle 10 in the form shown is of the cushioned underframe type and includes generally an underframe 13 on which there is slidably mounted for longitudinal movement relative to the underframe a container supporting structure or rack 14.

The underframe 13 includes a base 15 having side sill members 16 in the form of channels along the sides thereof. Mounted intermediate the side sills is the rack 14 including a pair of I-beams 17 held spaced by way of cross-members (not shown). The rack 14 is mounted on the base 13 by way of clips 18 which serve to support the rack 17 for longitudinal sliding movement. The longitudinal movement of the rack 14 relative to the underframe 13 is determined by cushioning means of any well-known suitable type (not shown) secured between the underframe 13 and the rack 14 so as to cushion impacts applied on the underframe 13 through the couplers (not shown) from the rack 14. For the purpose of maintaining the containers 11 suitably positioned on the rack 14, in the form shown, there is fixed on the I-beams 17 indexing means 19 which are spaced on the I-beams 17 and are received in complementary receptacles 20 formed in the base 21 of the container 11. These locating or indexing means 19 may be in different forms such as the pyramid like indexing devices, as shown, or hold-down clamps which serve to position or retain the containers fixed on the rack.

The container of which only one lower end corner is shown is of more or less conventional skin covered frame structure and includes the base 21 having at each end the bottom cross-members 22 in the form of a hollow structural member and a plurality of lengthwise spaced channel cross-members 23 disposed between the end members 22. Supported on and fixed to the upper ends of the cross members 22 and 23 is the floor 24. In the form of container 11 shown, the indexing receptacles 20 are each located between the end cross members 22 and the immediate adjacent channel cross-members 23 between which there is connected a receptacle reinforcing plate 25.

The above structure is of more or less conventional construction. Heretofore, when containers have been loaded on the rack 14 as by a hoisting mechanism and the attitude of the container is often-times canted such that one end edge of the end cross-members 22 of the container 11 strikes the rack structure 14, as shown in FIG. 1, whereupon the impact of the container 11 on the rigid rack structure 14 causes severe localized stresses in the end cross-member 22. This oftentimes causes the container to break down or fail at the point of impact and perhaps even cause damage to the lading within the container. In accordance with the present invention, it is proposed to relieve localized stresses caused by the impact of loading the container on the support means by the stress relieving device of the present invention. The stress relieving device 12 is arranged relative to the locating means 19 so as to contact the end edge of the container 11 when the receptacles 20 are substantially in alignment with the locating means 19. In the form illustrated in FIG. 1, only one of the stress relieving devices 12 is shown for engaging the right-hand corner of the container. However, it is to be understood that a similar stress relieving device is located adjacent the left-hand corner of the container so that in the event the tilting occurs in the opposite direction, the stresses which would occur due to severe impact are also relieved.

The stress relieving device 12 includes a cross bar 26 positioned transversely to the I-beams 17 and is rockably mounted for movement in a transverse plane about a pin 27 fixed to a channel member 28 which is supported at each of the I-beams 17. Fixed to each of the ends of the cross bar 26 and fitting within cutouts 29 in the I-beams 17 is a pad 30 having a supporting surface 31 for engaging the bottom end portion of the container 11 including the end cross-member 22. The end engaging pad 30 is rockably mounted on a pin 32 fixed to the cross bar 26. The pin 32 is arranged normal to the rocking axis of the cross bar 26 so that the support surface 31 of the pad 30 is rockable into and out of the plane of the support surface of the rack 14.

In operation, when a container 11 is hoisted and lowered on to the support rack 14, for example, in the attitude shown in FIG. 1 in which the container 11 is canted relative to both the longitudinal and transverse axes of the support surfaces of the rack 14 upon engagement of the end of the container with the stress relieving device, the cross bar 26 rocks about the pin 27 so as to conform to the transverse angularity of the container 11 and the pads 30 rock about their pins 32 so that the supporting surfaces 31 conform to the longitudinal attitude of the container 11. In this manner, the localized stresses of the impact which are caused by striking the rigid rack structure is distributed via the cross bar 26 and the two pads 30 along the length of the end cross-member 22 of the container 11. Moreover, some of the stresses caused by impact are also distributed by way of pads 30 through the reinforcing plate 25 on the bottom of the container 11 to the adjacent intermediate cross-member 23. Thereafter, the container is lowered into the normal position shown in FIG. 4 and secured to the rack.

Figure 5:
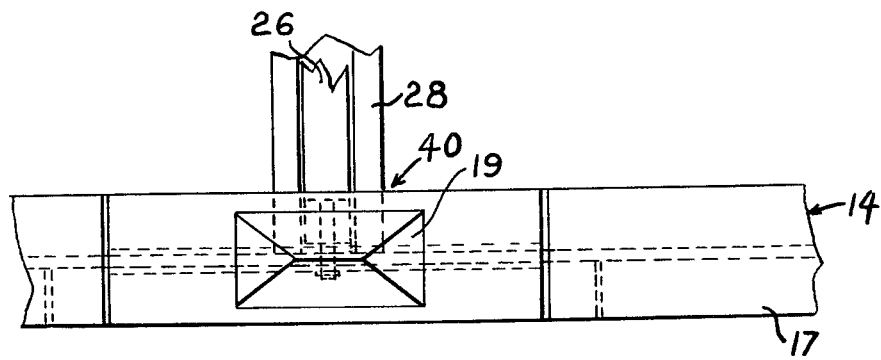
FIG. 5 is a fragmentary top plan view similar to FIG. 3, but showing a further embodiment of a stress relieving device embodying the principles of the present invention.
Figure 6:
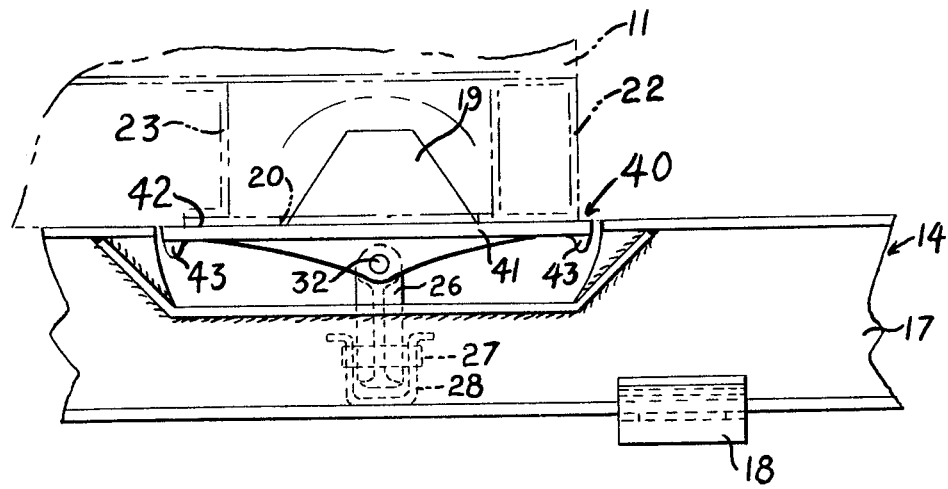
FIG. 6 is a side elevational view of FIG. 5, showing, in phantom, a container mounted on a container support structure and the stress relieving device in the normal loaded position of the container.

Referring now to FIGS. 5 and 6, showing a further embodiment of the invention, the stress relieving device 40 is similarly constructed to the embodiment of FIGS. 1-4 and includes a cross bar 26 turnably mounted on the pin 27 carried by the channel member 28. However, the pads 41 at each end of the cross bar 26 are constructed such that it spans the end cross member 22 and the intermediate cross member 23 adjacent thereto. The pads 41 are each pivotally secured to a respective end of the cross bar 26 as by the pin 32 so that the supporting surface 42 is rockable into and out of the plane of the supporting surface of the rack 14. With the particular type of container shown, the indexing receptacle 20 is located intermediate the end cross member 22 and adjacent intermediate cross member 23. Accordingly, the indexing means 19 are positioned and fixed on the rockable pad 41 so that the ends of the container are supported on the pads 41 when the receptacles 20 are seated on the indexing means 19. It is to be understood, of course, that in the event other types of locating means are employed or if they are differently located with respect to the ends of the container the locating means will be correspondingly positioned on the rack or pad. For the purpose of resisting the shear forces to which the pad 19 is subject when the indexing means 19 is located on the pad 41 the latter is provided at each end with downward projections 43 which are aligned with the vertical web of the I-beam 17.

With the above described structure, in the event that a container is initially lowered on to the support rack 14 in the canted attitude shown in FIG. 1, upon engagement of the container end with one of the pads 41 the cross bar 26 tilts about the pin 27 and assumes the transverse attitude of the container and the pads 41 rock about their respective pins 32 and assume the longitudinal attitude of the base 21 of the container 11. In this manner, the shock of initial impact of the container on the rack 14 is distributed by way of pads 41 and cross bar 26 along the length of the end cross member 22 and to the intermediate cross member 23 by way of the pads 41 spanning the cross member 22 and adjacent intermediate cross member 23. Such distribution of the impact shock tends to equalize the stresses in the aforementioned structural members so as to reduce a localized stress concentration capable of breaking down the container.

What is claimed is:

1. In a freight vehicle, a support for detachably securing cargo carrying containers of the type having locating means provided thereon, said support structure comprising a container platform having a substantially rigid planar supporting surface for supporting the container thereon, means on said platform complementary to the locating means on the container for positioning the container on said platform, and means on said platform substantially universally movable out of and into a position coplanar with said rigid planar supporting surface, said substantially universally movable means being disposed to be contacted by respective end corners of the container during lowering of the latter on to said platform when the container locating means are in substantial alignment with said complementary means on said platform and being movable out of said coplanar position to conform to the attitude of the end edge portion of the container and to provide surface contact therealong.

2. In a freight vehicle, a support structure for detachably securing cargo-carrying containers thereon comprising a container platform having a rigid planar supporting surface for supporting said containers, means on said platform for locating said containers on said platform having a planar surface movable into and out of planar relationship with said rigid planar supporting surface, and means substantially universally movably mounted on said platform, said substantially universally movable means including planar surface means engageable along a length of the bottom end edge portion of the container and movable out of coplanar relationship with said rigid planar supporting surface to conform to the attitude of said container when said container is lowered on to said platform in substantial alignment with said positioning means thereby to relieve said end edge from localized stresses resulting from impact forces associated with lowering said container on said rigid planar supporting surface of said platform.

3. In a freight vehicle, a support structure for detachably securing cargo-carrying containers thereon comprising a platform including a plurality of rigid longitudinal extending substantially rigid horizontal support members having a support surface for supporting said containers thereon, means on said platform for locating said containers thereon, and planar means on said platform mounted on said support members for rocking movement into and out of coplanar relationship with said planar substantially rigid support surface in a plane transverse to said substantially rigid horizontal support surface of said support members and including means engageable with the respective end edge portions of said container and rockable about an axis normal to said transverse rocking plane into and out of the plane of said substantially rigid horizontal support surface to conform to the attitude of a container being lowered on to said platform in substantial alignment with said locating means thereby to relieve said end edge of said container from localized stresses associated with lowering said container on said rigid planar supporting surface platform.

4. In a freight vehicle, a support structure for detachably securing cargo-carrying vehicles thereon comprising a rack including a pair of parallel spaced beams providing a container support surface, means on said support surface for locating the containers on said beams, and means positioned relatively to said container locating means for relieving localized stresses in the end edges of the container when the latter is positioned on said container support surface, said localized stress relieving means including planar means universally mounted on said rack and planar surface means fixed for movement on said universally mounted means and movable into and out of coplanar relationship with said container support surface engageable in planar contact with an end corner portion of said container to conform to the attitude of the container being lowered on to said rack in substantial alignment with said locating means thereby to distribute localized stresses in the end edge of the container over a greater extent thereof.

5. The invention as defined in claim 4 in which said universally mounted means includes a cross arm rockably mounted for movement in a plane transverse to said spaced beams, and means mounting said surface means on said cross arms for rocking movement about an axis normal to said transverse rocking plane.

6. The invention as defined in claim 5 in which said planar surface means engageable in planar contact with the container comprises a pair of pads mounted on the respective ends of said cross member.

7. The invention as defined in claim 6 in which said pads includes container locating means secured thereon.

References Cited in the file of this patent
UNITED STATES PATENTS

| | | |
|---|---|---|
| 2,047,955 | Fitch | July 21, 1936 |
| 2,332,991 | Commire | Oct. 26, 1943 |
| 2,901,201 | Taylor et al. | Aug. 25, 1959 |
| 2,973,174 | Stanwick et al. | Feb. 28, 1961 |
| 3,001,679 | Canning et al. | Sept. 26, 1961 |